United States Patent
Lengwehasatit

[19]
[11] Patent Number: 6,167,092
[45] Date of Patent: Dec. 26, 2000

[54] METHOD AND DEVICE FOR VARIABLE COMPLEXITY DECODING OF MOTION-COMPENSATED BLOCK-BASED COMPRESSED DIGITAL VIDEO

[75] Inventor: Krisda Lengwehasatit, San Diego, Calif.

[73] Assignee: Packetvideo Corporation, San Diego, Calif.

[21] Appl. No.: 09/373,150

[22] Filed: Aug. 12, 1999

[51] Int. Cl.[7] .............................. H04N 7/30; G06F 17/14
[52] U.S. Cl. ...................... 375/240.2; 382/250; 708/402
[58] Field of Search ....................... 375/240.2; 382/250; 708/402; H04N 7/30

[56] References Cited

U.S. PATENT DOCUMENTS

| | | | |
|---|---|---|---|
| 5,394,349 | 2/1995 | Eddy | 708/402 X |
| 5,452,466 | 9/1995 | Fettweis | 708/402 X |
| 5,767,907 | 6/1998 | Pearlstein | 375/240.2 |
| 5,990,958 | 11/1999 | Bheda et al. | 348/407.1 |

*Primary Examiner*—Howard Britton
*Attorney, Agent, or Firm*—Patents +TMS, P.C.

[57] ABSTRACT

A method and device compute the inverse discrete cosine transform (IDCT) in a block based motion compensated digital video decoder, such that the computational complexity is dependent on syntax cues from an input block, and the resulting overall complexity is greatly reduced on average. The method and device provide a means for selecting a set of pruned IDCT algorithms based on the statistics of generic coded video data. The classification of input IDCT blocks uses the last non-zero coefficient obtained as a by-product of decompression and dequantization. The mapping from the last non-zero coefficient to a corresponding set of separable one-dimensional IDCT algorithms is performed efficiently with the careful consideration of memory requirements, mapping complexity, and pruned IDCT-complexity tradeoffs.

8 Claims, 4 Drawing Sheets where → is subtraction, C4 is 1/sqrt(2) and Rot is rotation counter clockwise.

| 1 | 2 | 6 | 7 | 15 | 16 | 28 | 29 |
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

METHOD AND DEVICE FOR VARIABLE COMPLEXITY DECODING OF MOTION-COMPENSATED BLOCK-BASED COMPRESSED DIGITAL VIDEO

BACKGROUND OF THE INVENTION

The present invention generally relates to input-dependent computation of inverse transformations used in decoding block-based, compressed digital video bitstreams. With the advancement in information theory in the latter half of this century, the transmission of image and video data has become possible in digital formats over low bandwidth channels. Information theory allows digital video to be systematically compressed such that the size of the compressed bitstream is much less than the original with some sacrifice in the form of distortion from the original data. In order for any decoder to be able to reconstruct video frames from a compressed bitstream, the format of the bitstream must be known to the decoder. Standardization is one way to ensure that a bitstream is decoded correctly by different decoders. In most well known digital video compression standards, such as MPEG-1, MPEG-2, MPEG-4, H.261, and H.263, a compression scheme called hybrid motion-compensated block-based video coding is employed.

The method a decoder performs for the above standards may be summarized as follows. A frame of video is broken down into a smaller unit called block which is normally 8×8 pixels in size. For each frame of video being encoded at a particular time, each block of data is decoded by finding a prediction of the current block via motion compensation using a motion vector decoded from the bitstream and the previously decoded video frame. Then, transform coefficients are obtained by decompressing and dequantizing a portion of the compressed data that corresponds to the current block. The next tasks involve computing an inverse transformation to get coefficients that represent the intensity level of pixels in the block. The resulting block is added back to the predicted block in the first step, and become a new reconstructed block. In all of the standards mentioned, the Discrete Cosine Transform (DCT) and its inverse (IDCT) are used to obtain and reverse the transform coefficients. This transform is used because it provides good compression performance with the possibility for effective hardware implementation. Furthermore, the two-dimensional IDCT is a separable transform, i.e. it may be performed repetitively by one-dimensional IDCT operations applied for all rows (row-wise IDCT) and then for all columns (column-wise IDCT), or vice versa. This reduces the complexity and size of a program used to implement the transform.

For a decoder, the IDCT is an essential component requiring exact performance to avoid drift between encoder and decoder. This is a result of the predictive nature of video coding. Since the transformation must be performed on every coded block and involves a considerable amount of arithmetic computation, it is considered as one of the major computationally intense tasks in video decoding systems. There have been several approaches to computing the DCT and IDCT in an efficient manner. Those techniques involve exploiting trigonometric properties of the transform to remove redundant computations. Their goal is to minimize the complexity regardless of the content of the input, e.g. they assume that all DCT coefficients are non-zero. Algorithms that have input-dependent complexity are also known. The input-dependency is achieved by performing classification of the input block of DCT coefficients, and applying different operations needed for the IDCT based on the class of the block. For example, a block may be classified into an "all-zero" block when all of the DCT coefficients in the block are zero, a "DC-only" block when only the (0,0)-th DCT coefficients are non-zero, "4×4-DCT" block when only 16 coefficients in the low 4×4 DCT frequency components are non-zero, and "8×8-DCT" for any other cases. These methods do not use any information from the decoded bitstream to classify the block of DCT coefficients before performing the IDCT, but rather, they test the value of all coefficients directly. This may be very inefficient in certain cases.

Based on the lack of sufficient methods for performing fast video decoding with low complexity, a need exists for a method and a device to improve the performance of a block-based video decoder which may exploit the properties of the decoded bitstream to reduce the complexity of performing an inverse DCT transformation. This transformation is the most commonly performed operation in the decoder.

SUMMARY OF THE INVENTION

The present invention provides a method and an apparatus for computing the IDCT for a block-based, motion compensated digital video decoder, in a variable complex manner. To this end, in an embodiment, the present invention provides a method comprising the steps of: defining a set of reduced-complexity IDCT algorithms (denoted here as pruned IDCT algorithms); and using syntax cues to determine which pruned IDCT algorithm is appropriate. The syntax cues include bitstream elements defining the last non-zero coefficient, in zigzag scan order, extracted from the compressed bitstream during the decompression process. The set of one-dimensional pruned IDCTs are defined based on the assumption that the last 64 minus M coefficients in the zigzag scan order (M ranges from 1 to N) are all zero. The parameter P determines N via the relationship that P percent of the time, the position of the last non-zero coefficient is less than or equal to N. The mapping from the last nonzero coefficient to the set of separable one-dimensional pruned IDCTs is performed efficiently by a lookup-table of functions in an embodiment of the method. Alternatively, the mapping is implemented by an interrupt-based subroutine for the device embodiment.

To this end, in an embodiment of the present invention, a method is provided for computing an inverse discrete cosine transform by using a number of non-zero coefficients and an associated function mapping method based on video compression standard syntax cues. The method comprises the steps of: generating a set of reduced complexity implementation candidates for the inverse discrete cosine transform; using video compression standard syntax cues to obtain the number of non-zero coefficients for the inverse discrete cosine transform; and mapping the number of non-zero coefficients to a corresponding reduced complexity implementation candidate inverse transformation.

In an embodiment, statistics of the index of last non-zero coefficients are collected, and a predetermined value N is selected from a predetermined set of percent values is selected. A set of one-dimensional pruned IDCTs necessary for each predetermined value N is generated which is based on a predetermined assumption that 64-M coefficients in predetermined order are zero for M, where M ranges from 1 to N.

In an embodiment, transform coefficients of a block from a compressed bitstream are decoded, and a position of a last non-zero transform coefficient is determined within the block with respect to a predetermined scan order.

In an embodiment, an efficient look-up table is generated to map an index of the last non-zero transform coefficient to a corresponding set of pruned IDCTs. Mapping is provided from the last non-zero DCT index to a corresponding set of pruned IDCTs using the efficient look-up table.

In another embodiment of the present invention, a device is provided for computing an inverse discrete cosine transform by using a number of non-zero coefficients and an associated function mapping method based on video compression standard syntax cues. The device has a means for generating a set complexity implementation candidates for the inverse discrete cosine transform. Means is provided for using syntax cues to obtain the number of non-zero coefficients for the inverse discrete cosine transform. Means for mapping the number of non-zero coefficient to a corresponding reduced complexity implementation candidate inverse transformation is further provided.

In an embodiment, a means is provided for collecting statistics of the index of the last non-zero coefficients and selecting a predetermined value N from a predetermined set of percent values. Means for generating a set of one-dimensional pruned IDCTs necessary for each predetermined value, N, which is based on a predetermined assumption that 64-M coefficients in predetermined order are zero for M, where M ranges from 1 to N, is also provided.

In an embodiment, a means for decoding transform coefficients of a particular block from a compressed bitstream is provided. Further, a means for determining the position of the last non-zero transform coefficient within that block with respect to a predetermined scan order is also provided.

In an embodiment, a means for generating an efficient look-up table used to map an index of the last non-zero transform coefficient to a corresponding set of pruned IDCTs is provided. Means for mapping from the last non-zero DCT index to a corresponding set of pruned IDCTs using the efficient look-up table is further provided.

It is, therefore, an advantage of the present invention to provide a device and a method for performing fast video decoding.

Another advantage is to provide a device and a method for performing fast video decoding with low complexity.

Yet another advantage of the present invention is to provide a device and a method for computing in a variably complex manner the IDCT for a block-based, motion-compensated digital video decoder.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention is more fully described with reference to FIGS. 1–6. The invention may be applied to any linear transformation based on any fast implementation in addition to the one described more fully below.

Figures 1, 2:
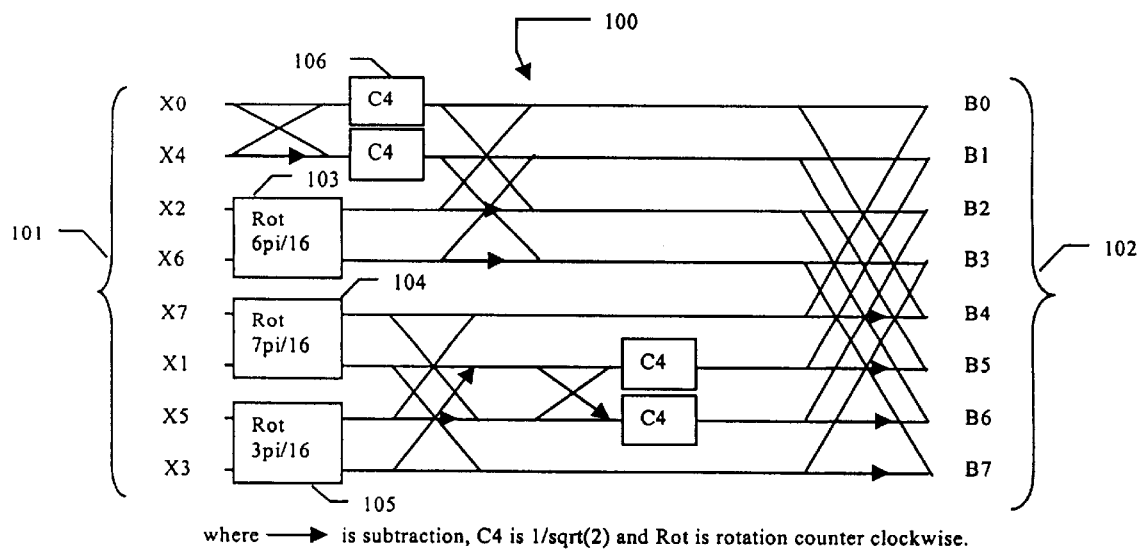
FIG. 1 illustrates a block diagram of an example of a fast implementation of an inverse DCT taking a vector of input size 8 DCT coefficients, and outputting a vector of eight spatial domain pixel values.
FIG. 2 illustrates a typical zigzag scan ordering from a two-dimensional block of data to one-dimensional zigzag scan data.

Referring to FIG. 1, an example 100 of a fast IDCT flow diagram is shown which takes a vector of the DCT coefficients as an input 101 and outputs a vector of an inverse transform 102. In this particular example, rational multiplications are needed in operations 103, 104, 105 and 106 where "C4" denotes multiplication by a constant +e,fra 1/ $\sqrt{2}$+ee, and "Rot Q" denotes rotation of inputs X and Y by an angle Q to produce a new representation: x and y, i.e. x=X cos(Q)+Y sin(Q), y=–X sin(Q)+Y cos(Q). If some points of the input vector are zeros, then the operations exclusively applied for those zero inputs may be omitted, e.g. if X1 and X7 are both zero, then the operation 104 is not necessary because the output of the operation 104 is zero. Therefore, with the knowledge of zero input points, the IDCT algorithm may be pruned to a reduced algorithm. It is possible to derive 256 pruned IDCT algorithms for all of the combinations of zero and non-zero input points in an input vector of size 8. Ideally, the input vector is tested to find out which pruned IDCT should be applied. Even though this guarantees the minimal IDCT complexity, in terms of memory requirements, all 256 pruned IDCT algorithms would have to be contained in the memory. This would increase the memory access time and finally result in an increase in overall computation time.

The present invention addresses the memory requirement mentioned above. With the memory limitation, the IDCT complexity reduction may be maximized by taking into account the statistics of the DCT coefficients of a two-dimensional block. These statistics are used, instead of those of a one-dimensional vector of rows or columns, to select a subset of frequently used pruned IDCT algorithms. This reduces the cost of memory allocation and memory access time. In addition, a fast testing method is used in classification to determine which pruned IDCT algorithms should be used for a particular block. The present invention also uses syntax cues from the encoded bitstream based on zigzag scanning.

In FIG. 2, an 8×8 block 200 is presented, and the number in each position of the 8×8 block represents the order in which the block is scanned. Zigzag scanning converts a two-dimensional DCT block into a one-dimensional DCT vector for better compression processing. After the zigzag scan, non-zero DCT coefficients tend to be dense at the beginning and sparse at the end of the scan, thus accommodating efficient compression. The present invention takes advantage of the information about the last non-zero DCT coefficient in the zigzag scan, a parameter which is always obtained from the decompression procedure.

In particular, the present invention finds a corresponding N, which is the position of the last nonzero coefficient, such that P% of the time the last nonzero coefficients occurs at positions between 0 and N. Then, a set of pruned IDCT algorithms is designed for the case when the first M coefficients, in zigzag order, are non-zero for M=1,2, N. By converting back the non-zero range in zigzag order to a corresponding area in a two-dimensional block, a set of separable one-dimensional pruned IDCT algorithms is determined for each value of M. If the last non-zero position is greater than N, all 64 DCT coefficients are assumed to be non-zero, and the full version of IDCT is then applied. Even if the last non-zero position is at M, it is not always the case that all of the previous DCT coefficients are also non-zero. However, for the reason of keeping the memory requirements and the testing complexity low, the present invention assumes that all of the previous coefficients are also non-zero.

Figure 3:
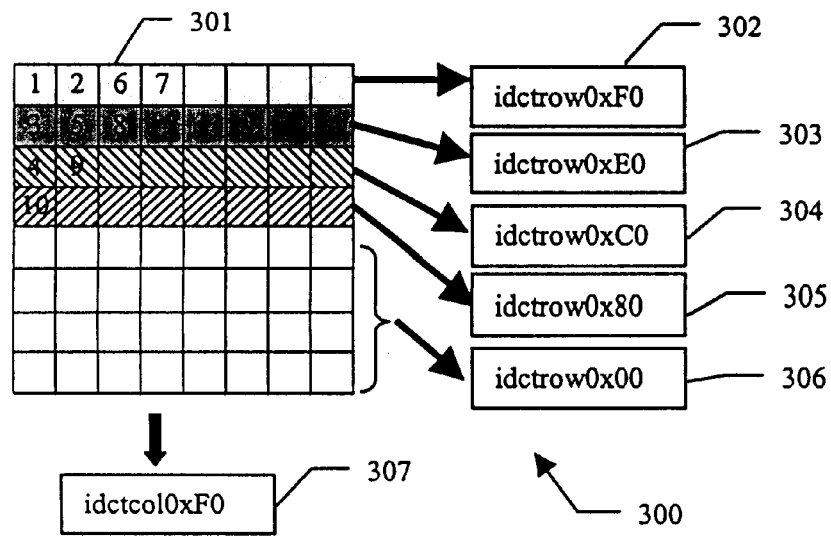
FIG. 3 illustrates a block diagram of an example of mapping from the last non-zero coefficient in zigzag order to a set of one-dimensional inverse DCT algorithms required for computation of the exact two-dimensional inverse DCT.

FIG. 3 illustrates an example 300 of the method of the present invention. In this example 300, the index of the last non-zero coefficient in a block,301, is detected to be 10. With the assumption that all coefficients prior to the $10^{th}$ coefficient are also non-zero, one-dimensional row-wise and column-wise pruned IDCTs may be determined for each row of the DCT blocks and for each column of the intermediate result after row-wise IDCTs which is the input to column-wise IDCTs. For the first of the four rows,pruned IDCTs, idctrow0×F0(302),idctrow0×E0(303),idctrow0×C0(304) and idctrow0×80(305) are applied to the first, second, third and fourth rows, respectively. Here, the numbers S and T in idctrow0×ST are two hexadecimal numbers. When these numbers are combined to form a binary base number, the content of the i-th digit ('1' or '0') represents the i-th DCT coefficient in the input vector as 'non-zero' or 'zero'. For the fifth through eighth rows, the pruned IDCT, idctrow0×0 (306), is applied, assuming all inputs are zero. For all of the columns, the pruned IDCT idctco10×F0(307), is applied.

Figure 4:
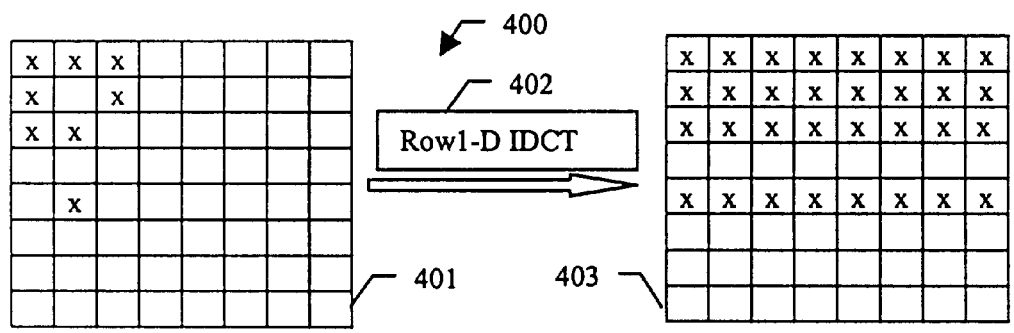
FIG. 4 illustrates a diagram of a procedure to deduce the zero-non-zero coefficient information for the input to a column-wise IDCT from the input of a row-wise IDCT.

The reason why idctco10×F0(302) is selected in the example (301) is from the fact that after the row-wise IDCT, if at least one of the input points is non-zero, all of the output points are most likely non-zero. This leads to a prediction of the type of input to the column-wise IDCT. FIG. 4 illustrates the prediction of input of column-wise IDCT based on the knowledge of input of row-wise IDCT. In FIG. 4, a diagram 400 of the non-zero coefficients of the input block 401 are labeled as 'x'. After applying a one-dimensional row-wise IDCT to every row 402, the nonzero coefficients of the output block 403 are generated. This generated information is then used for the input block 401 to column-wise IDCT.

At this point, the assumption that the first M coefficients are all non-zero may be justified by the fact that it allows for smaller memory for a few pruned one-dimensional IDCTs. There may be many combinations of pruned IDCTs for each value of M. The mapping from M to the appropriate set of the pruned IDCTs may be done efficiently by a lookup-table that contains pointers to a set of pruned IDCTs for each row and column.

Figure 5:
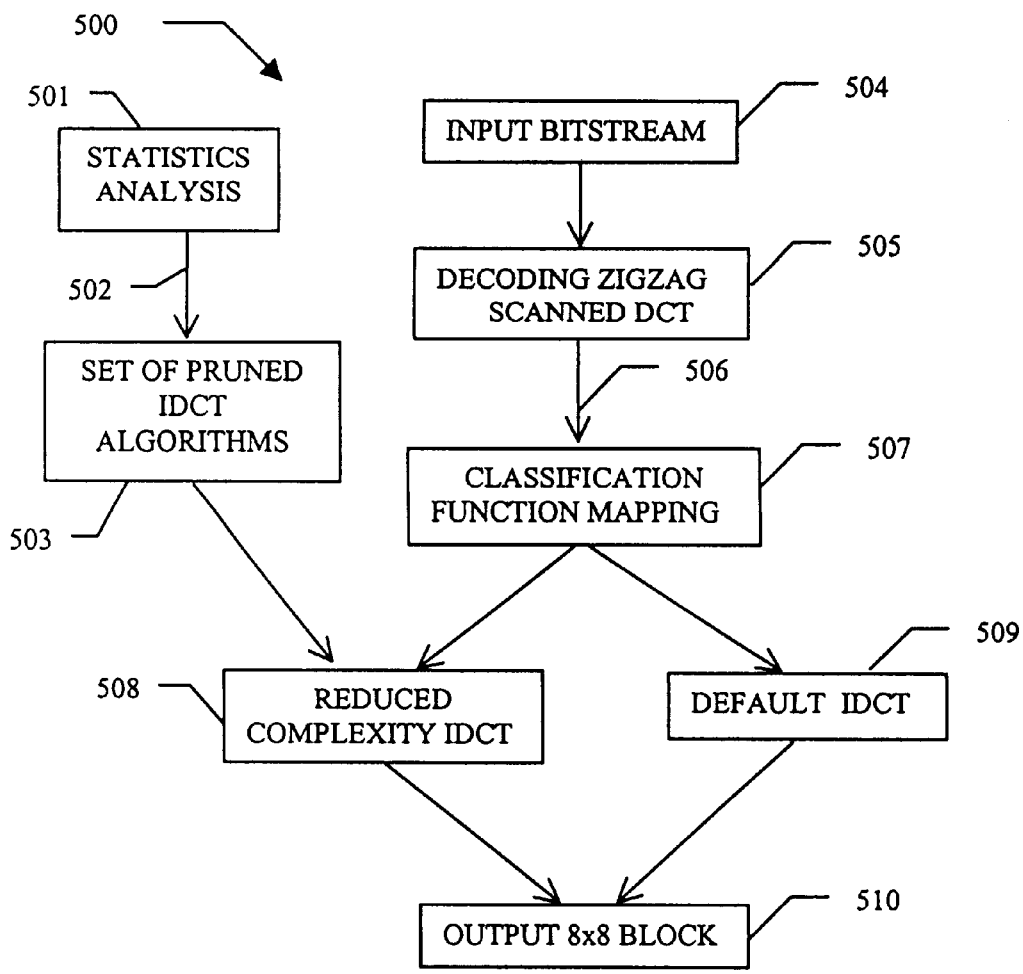
FIG. 5 illustrates a flow diagram of a preferred embodiment of a method for a syntax cue based variable complexity inverse transformation of block-based motion-compensated digital video data.

One preferred embodiment of a method of the present invention is further described with reference to FIG. 5 which illustrates a flowchart 500 of a method for computing an inverse discrete cosine transform for the decoding of a compressed bitstream to form an 8×8 block. First, at step 501, the statistics of the index of the last non-zero coefficients are collected from training data. Next, the value N is chosen such that P percent of the blocks have the last non-zero position less than or equal to N. P is a predetermined parameter based on memory requirements. A smaller P implies a greater memory limitation. From the number N at 502, a set of one-dimensional pruned IDCT algorithms is derived and kept in memory in step 503. These pruned IDCT algorithms are necessary for any case with the last non-zero coefficient no greater than N. The algorithms also assume that the coefficients prior to the last nonzero coefficient in zigzag order are all non-zero.

After the value N and the corresponding set of pruned IDCT algorithms are obtained, the decoding of block-based compressed video data is performed as follows. The input bitstream shown at step 504 which corresponds to a block being decoded is decompressed at step 505 in zigzag scan order to obtain the DCT coefficients. As a by-product, the last on-zero position 506 is also obtained. If the last non-zero position is less than or equal to N, the classification is performed as shown at step 507 by mapping the last non-zero position to a sub-set of one-dimensional pruned IDCT algorithms, as shown at 508, chosen from step 503 and as needed for each row and column of this particular block. On the other hand, if the last non-zero position is greater than N, a default IDCT algorithm shown at step 509, which may be any fast algorithm, such as the one described with reference to FIG. 1, is applied. With either of the steps 508 or 509, the output block which is shown at 510, and which is the inverse transform, is finally obtained.

Figure 6:
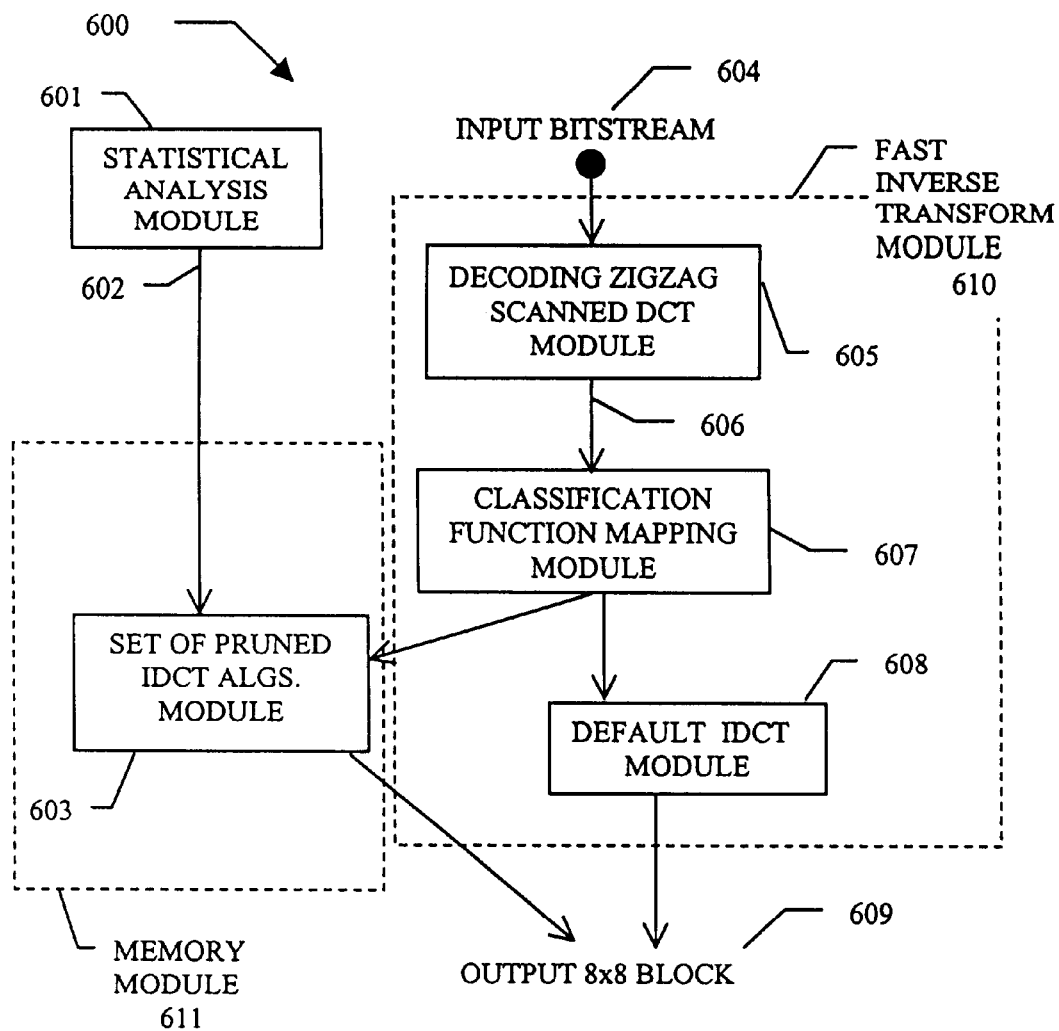
FIG. 6 illustrates a block diagram of a preferred embodiment of a device for a syntax cue based variable complexity inverse transformation of block-based motion-compensated digital video data.

Another preferred embodiment of this invention is the device shown in FIG. 6. Here, the pruned IDCT is executed in an interrupt-based manner. FIG. 6 illustrates a device 600 including a means for computing an inverse discrete cosine transform for the decoding of a compressed bitstream to form an 8×8 block. The device 600 has a memory module 611 and a fast inverse transform module 610. Outside of the modules 610 and 611, in module 601, the statistics of the index of last non-zero coefficients are collected from training data, and the value N is computed such that P percent of the blocks have the last non-zero position less than or equal to N. P is a predetermined value stored in memory chosen as a function of the available memory. A smaller P implies a greater memory limitation. From the number N identified at 602, a set of one-dimensional pruned IDCT modules are derived and kept in the memory in module 603. These pruned IDCT modules 603 are necessary for any case having a last non-zero coefficient no greater than N.

After the value N and the corresponding set of pruned IDCT modules 603 are implemented, the decoding of block-based compressed video data is implemented. The input bitstream 604, which corresponds to a block being decoded, is decompressed in module 605 to obtain a set of DCT coefficients. As a by-product, the last non-zero position in zigzag order, as identified at 606, is also obtained and passed to the next module. In a classification module 607, if the last non-zero position is less than or equal to N, a sequence of interrupts is generated based on the last non-zero position to call a sequence of one-dimensional pruned IDCT modules needed for this particular block. If the last non-zero position is greater than N, a default IDCT module 608 is applied. Finally, the output block 609 which is the inverse transform is obtained. For any decoder that requires an inverse linear transformation to be performed on a block of transform coefficients, of which the IDCT is a special case, the present invention may be used. The present invention also requires access to the information pertaining to the last non-zero coefficient position in any two-to-one-dimensional scan order, of which the zigzag scan order is a special case.

Although exemplary embodiments are described above, it will be obvious to those skilled in the art that many modifications and alterations to this method and device for syntax-cue-based IDCT computation may be made without departing from the invention. Accordingly, it is intended that all such modifications and alterations be included within the spirit and scope of the invention as defined in the following claims.

I claim:

1. A method for computing an inverse discrete cosine transform by using a number of non-zero coefficients and an associated function mapping method based on video compression standard syntax cues, the method comprising the steps of:

generating a set of reduced complexity implementation candidates for the inverse discrete cosine transform;

using video compression standard syntax cues to obtain the number of non-zero coefficients for the inverse discrete cosine transform; and mapping the number of non-zero coefficients to a corresponding reduced complexity implementation candidate inverse transformation.

2. The method of claim 1 further comprising the steps of:

collecting statistics of the index of the last nonzero coefficients and selecting a predetermined value N from a predetermined set of percent values; and generating a set of one-dimensional pruned IDCTs necessary for each predetermined value N which is based on a predetermined assumption that 64-M coefficients in predetermined order are zero for M, where M ranges from 1 to N.

3. The method of claim 1 further comprising the steps of:

decoding transform coefficients of a block from a compressed bitstream; and determining a position of a last non-zero transform coefficient within the block with respect to a predetermined scan order.

4. The method of claim 1 further comprising the steps of:

generating an efficient look-up table to map an index of the last non-zero transform coefficient to a corresponding set of pruned IDCTS; and mapping from the last non-zero DCT index to a corresponding set of pruned IDCTs using the efficient lookup table.

5. A device for computing an inverse discrete cosine transform by using a number of non-zero coefficients and an associated function mapping method based on video compression standard syntax cues, the device comprising:

means for generating a set complexity implementation candidates for the inverse discrete cosine transform;

means for using syntax cues to obtain the number of non-zero coefficients for the inverse discrete cosine transform; and means for mapping the number of non-zero coefficient to a corresponding reduced complexity implementation candidate inverse transformation.

6. The device of claim 5 further comprising:

means for collecting statistics of the index of last non-zero coefficients and selecting a predetermined value N from a predetermined set of percent values; and means for generating a set of one-dimensional pruned IDCTs necessary for each predetermined value N which is based on a predetermined assumption that 64-M coefficients in predetermined order are zero for M, where M ranges from 1 to N.

7. The device of claim 5 further comprising:

means for decoding transform coefficients of a particular block from a compressed bitstream; and means for determining the position of the last nonzero transform coefficient within that block with respect to a predetermined scan order.

8. The device of claim 5 further comprising:

means for generating an efficient look-up table used to map an index of the last non-zero transform coefficient to a corresponding set of pruned IDCTs; and means for mapping from the last non-zero DCT index to a corresponding set of pruned IDCTs using the efficient look-up table.

* * * * *